UNITED STATES PATENT OFFICE.

STEFANUS JOHANNES VERMAES, OF DELFT, NETHERLANDS, ASSIGNOR TO MIJN-BOUWMAATSCHAPPIJ AEQUATOR, A LIMITED LIABILITY COMPANY, OF THE HAGUE, NETHERLANDS.

PROCESS OF TREATING REFRACTORY ORES.

1,234,426.      Specification of Letters Patent.      Patented July 24, 1917.

No Drawing.     Application filed August 7, 1916. Serial No. 113,634.

*To all whom it may concern:*

Be it known that I, STEFANUS JOHANNES VERMAES, a subject of the Queen of the Netherlands, residing at Delft, Kingdom of the Netherlands, have invented certain new and useful Improvements in Processes of Treating Refractory Ores, of which the following is a specification.

According to the present invention ores containing manganese dioxid are rendered suitable for treatment with cyanid or other suitable solvents by mixing them intimately with an organic substance and a chlorinating agent and subjecting the mixture to the action of heat.

The invention is especially directed to the recovery of silver from ores of this character, recovering at the same time the gold contained therein. Up to the present time, no process is believed to have been known for recovering the silver advantageously from such ores, because of the fact that the silver therein is combined with oxygen and manganese dioxid, forming a very stable compound which is insoluble in the usual solvents for silver; *e. g.* it is impossible to obtain the silver from these ores by treating them with alkaline cyanids. If, however, the silver can be converted into a chlorid, this drawback is overcome, because chlorid of silver, though insoluble in water, is soluble in alkaline cyanids.

For the recovery of silver, it is not sufficient, therefore, merely to chloridize the ores, for this would leave the silver still in an insoluble state; but it is necessary to extract the silver from the chloridized ore by an alkaline cyanid or other suitable treatment.

It is known, however, to subject such ores to chloridizing roasting but the temperature required therefor is so high that large quantities of gold and silver are lost by volatilization and at the same time the loss of common salt by volatilization is considerable.

By effecting the chlorination according to the present invention, at the moment that the manganese-dioxid is reduced to a lower oxid, temperatures are available at which no gold or silver chlorid is volatilized.

For the reduction during chlorination any organic substance may be employed which will act upon manganese-dioxid at the temperatures used. Good results may be obtained, for example, by employing sugar, rice, Indian corn, shells of cocoa-nuts, cottonseed, wood and bark, while peat has also given satisfactory results.

As the chlorinating agent, common salt, *i. e.*, chlorid of sodium, may be used, though many other chlorids will give good results. As the temperature remains beneath the point at which common salt begins to volatilize considerably, the excess of salt goes into solution, when the mixture is lixiviated. The salt can therefore be recovered and not much more than the theoretical quantity of the chlorinating agent is used.

The intimate mixing may be effected by grinding the ore together with the organic substance in a solution of common salt.— When the material is comminuted sufficiently, it may be filtered and the filter-cake may be dried. The mixture is then heated to the temperature necessary for the reaction, *e. g.*, about 320 to 330° C., though results have been obtained at higher temperatures.

The ore which originally is a dark brown black powder is converted into a light brown tinted, very slightly sintered mass which gives at the usual treatment a very good yield of valuable metals.

What I claim is:

1. The process of treating refractory manganese-dioxid-containing ores of precious metals which comprises the steps of mixing the ore with a reducing agent and with a chlorinating agent, roasting the mixture at a comparatively low temperature and leaching the roasted product with a solution of an alkaline metal cyanid.

2. The process of treating refractory manganese-dioxid-containing silver ores which comprises the steps of mixing the ore with a reducing agent and with a chlorinating agent roasting the mixture at a temperature insufficient to volatilize silver chlorid, and leaching the roasted product with a solution of an alkaline metal cyanid.

In testimony whereof I have hereunto set my hand.

STEFANUS JOHANNES VERMAES.